US010201464B2

(12) United States Patent
Kalf et al.

(10) Patent No.: US 10,201,464 B2
(45) Date of Patent: Feb. 12, 2019

(54) CHASSIS ARRANGEMENT FOR AN ELECTRICALLY POWERED WHEELCHAIR AND AN ELECTRICALLY POWERED WHEELCHAIR COMPRISING THE SAME

(71) Applicant: Permobil AB, Timrå (SE)

(72) Inventors: Erik Kalf, Matfors (SE); Pär Torgersson, Matfors (SE); Herbert Van de Wal, Alno (SE)

(73) Assignee: PERMOBIL AB (SE)

( * ) Notice: Subject to any disclaimer, the term of this patent is extended or adjusted under 35 U.S.C. 154(b) by 0 days.

(21) Appl. No.: 15/511,383

(22) PCT Filed: Sep. 16, 2015

(86) PCT No.: PCT/EP2015/071208
§ 371 (c)(1),
(2) Date: Mar. 15, 2017

(87) PCT Pub. No.: WO2016/042023
PCT Pub. Date: Mar. 24, 2016

(65) Prior Publication Data

US 2017/0296409 A1 Oct. 19, 2017

(30) Foreign Application Priority Data

Sep. 19, 2014 (EP) .................................... 14185578

(51) Int. Cl.
*A61G 5/06* (2006.01)
*A61G 5/04* (2013.01)
(Continued)

(52) U.S. Cl.
CPC .............. *A61G 5/1078* (2016.11); *A61G 5/04* (2013.01); *A61G 5/042* (2013.01); *A61G 5/06* (2013.01)

(58) Field of Classification Search
CPC ...... A61G 5/04; A61G 5/042043; A61G 5/06; B60K 1/02; B60K 1/04
See application file for complete search history.

(56) References Cited

U.S. PATENT DOCUMENTS 5,435,404 A * 7/1995 Garin, III ............... A61G 5/043 180/6.5
2006/0076747 A1 4/2006 Pauls
(Continued)

FOREIGN PATENT DOCUMENTS

CA 2254372 A1 5/2000
CN 2482402 Y 3/2002
(Continued)

OTHER PUBLICATIONS

Office Action and Search Report for Chinese Patent Application No. 201580050518.9 dated Feb. 1, 2018, 7 pages.
(Continued)

*Primary Examiner* — Bryan A Evans
(74) *Attorney, Agent, or Firm* — McAndrews, Held & Malloy, Ltd.

(57) ABSTRACT

The present disclosure relates to a chassis arrangement (1) for an electrically powered wheelchair (35). The chassis arrangement (1) comprises a main chassis member (3) having a first side panel (3*a*) defining a first side of the main chassis member (3), and a second side panel (3*b*) defining a second side of the main chassis member (3), the second side being opposite to the first side, wherein each of the first side panel (3*a*) and the second side panel (3*b*) has spring attachment arrangements (3*g*, 3*h*) for attachment of spring assemblies (9*a*, 9*b*, 11*a*, 11*b*), wherein each of the first side panel (3*a*) and the second side panel (3*b*) has pivot arm attachment arrangements (3*e*, 3*f*) for attachment of pivot arms (5*a*, 5*b*, 7*a*, 7*b*), wherein the main chassis member (3) has a torsional
(Continued)

stiffness greater than 1200 Nm/degree. An electrically powered wheelchair comprising a chassis arrangement (1) is also presented herein.

7 Claims, 4 Drawing Sheets

(51) Int. Cl.

| | |
|---|---|
| ***B60K 1/04*** | (2006.01) |
| ***B60K 1/02*** | (2006.01) |
| ***A61G 5/10*** | (2006.01) |

(56) References Cited

U.S. PATENT DOCUMENTS

| | | | |
|---|---|---|---|
| 2011/0083913 | A1 | 4/2011 | Cuson |
| 2012/0012416 | A1 | 1/2012 | Mirzaie |

FOREIGN PATENT DOCUMENTS

| | | | |
|---|---|---|---|
| CN | 201042485 | Y | 4/2008 |
| CN | 101636139 | A | 1/2010 |
| CN | 202105116 | U | 1/2012 |
| CN | 103068352 | A | 4/2013 |
| WO | 2006042193 | A2 | 4/2006 |
| WO | 2011044405 | A1 | 4/2011 |

OTHER PUBLICATIONS

PCT International Search Report, PCT Application No. PCT/EP2015/071208, Int'l filing date of Sep. 16, 2015, dated Oct. 15, 2015, 3 pages.

* cited by examiner

CHASSIS ARRANGEMENT FOR AN ELECTRICALLY POWERED WHEELCHAIR AND AN ELECTRICALLY POWERED WHEELCHAIR COMPRISING THE SAME

CROSS-REFERENCE TO RELATED APPLICATIONS/INCORPORATION BY REFERENCE

The present application is the U.S. national phase under § 371 of International Application No. PCT/EP2015/071208, having an international filing date of Sep. 16, 2015, which claims priority to EP Patent Application Nos. 14185578.3, filed Sep. 19, 2014. Each of the above-mentioned prior-filed applications is hereby expressly incorporated herein by reference in its entirety.

TECHNICAL FIELD

The present disclosure generally relates to wheelchairs. In particular it relates to a chassis arrangement and to an electrically powered wheelchair comprising such a chassis arrangement.

BACKGROUND

Electrically powered wheelchairs commonly have a chassis arrangement or a frame to which the seating system is mounted. The chassis arrangement may comprise a main chassis member that may house inter alia the battery unit which powers the electric motor of the wheelchair, pivot arms pivotally coupled to the main chassis member, to which pivot arms the wheels are mounted, and energy accumulation members, such as springs, which co-operate with the pivot arms for controlling the suspension of the wheelchair.

In existing electrically powered wheelchairs the main chassis member, or chassis box, is typically made of a number of sheet metal parts that are riveted or welded together. The sheet metal is typically very thin, generally 2-4 mm, in order to keep the weight of the main chassis member as low as possible.

To be able to obtain adequate road handling of a wheelchair comprising a main chassis member of the aforementioned type, the springs must be relatively stiff. The weakness of the main chassis member may thereby be compensated for. As a result, the comfort experienced by the user will be relatively low, because the stiff springs provide poor damping. In addition to the relatively poor comfort experience, there is a risk that the main chassis member may be damaged due to its design.

SUMMARY

In view of the above, a general object of the present disclosure is to provide a chassis arrangement and an electrically powered wheelchair which solves or at least mitigates the problems of the prior art.

Hence, according to a first aspect of the present disclosure there is provided a chassis arrangement for an electrically powered wheelchair, wherein the chassis arrangement comprises: a main chassis member having a first side panel defining a first side of the main chassis member, and a second side panel defining a second side of the main chassis member, the second side being opposite to the first side, wherein each of the first side panel and the second side panel has spring attachment arrangements for attachment of spring assemblies, wherein each of the first side panel and the second side panel has pivot arm attachment arrangements for attachment of pivot arm assemblies, wherein the main chassis member has a torsional stiffness greater than 1200 Nm/degree.

A technical effect which may be obtainable thereby is a stiffer main chassis member. Due to the stiffer design of the main chassis member, softer springs may be utilised, resulting in a more comfortable experience for users.

According to one embodiment the spring attachment arrangements are arranged at an upper portion of the first side panel and the second side panel, and wherein the pivot arm attachment arrangements are arranged at a lower portion of the first side panel and the second side panel.

It has been found by the inventors that, at least for front wheel driven wheelchairs, the further away the spring attachment arrangements are located from the pivot arm attachment arrangements at each of the first side panel and the second side panel, the more comfortable suspension can be provided. It is thus particularly advantageous to provide the pivot arm attachment arrangements as low as possible on the first side panel and the second side panel, in the vicinity of the respective lower edge. Placement of the pivot arm attachment arrangements as low as possible on the first side panel and the second side panel is furthermore beneficial for the ability of a wheelchair to move upon, or climb, an edge, such as a sidewalk.

According to one embodiment the main chassis member consists of a single piece of metal. By providing a main chassis member that is made of a single piece of metal, i.e. which is integrated, there is no need to join several pieces of sheet metal pieces to create the main chassis member. The risk of damaging the main chassis member is thus reduced, because there is no risk of damaging welded joints or riveted joints as there are none. A more robust main chassis member may thus be provided.

According to one embodiment the single piece of metal has a thickness of at least 7 mm. For regular stainless steel, a minimum thickness of 7 mm provides the required torsional stiffness.

According to one embodiment the main chassis member is a bent plate which defines the first side panel and the second side panel, and which has a bottom portion extending between the first side panel and the second side panel. The main chassis member can thereby be made most rigid at its lower end, where the pivot arm attachment arrangements are provided, and which typically is the portion of the chassis arrangement that is subjected to the highest mechanical stress.

According to one embodiment each spring attachment arrangement comprises an opening extending into the first side panel or the second side pane, and wherein each pivot arm attachment arrangement comprises a journal or pivot extending from the first side panel or the second side panel.

According to a second aspect of the present disclosure there is provided an electrically powered wheelchair comprising a chassis arrangement according to the first aspect.

According to one embodiment the chassis arrangement has a torsional stiffness of at least 1800 Nm/degree.

According to one embodiment the main chassis member contributes to at least 50% of the torsional stiffness of the chassis arrangement.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
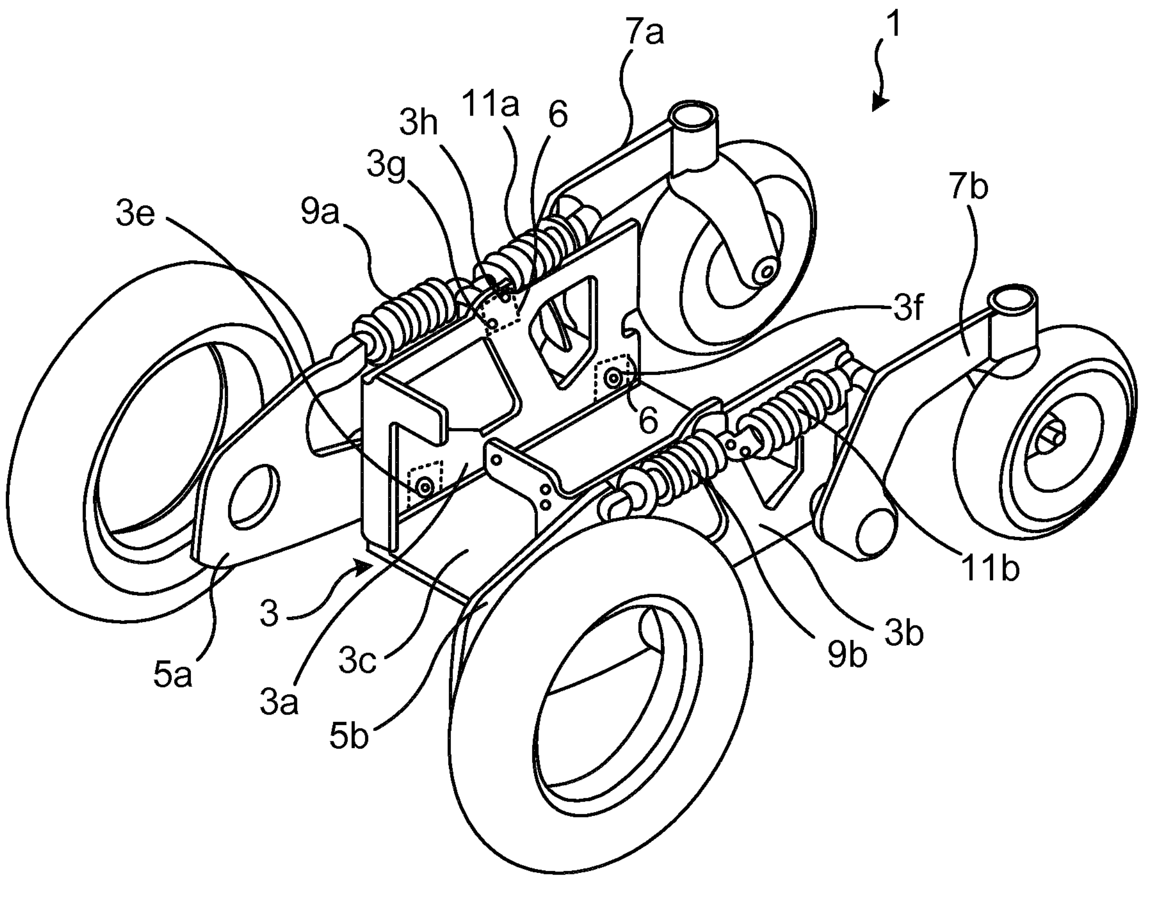
FIG. 1 is a perspective view of an example of a chassis arrangement for an electrically powered wheelchair.

FIG. 1 shows an example of a chassis arrangement 1 for an electrically powered wheelchair. The chassis arrangement 1 comprises a main chassis member 3 which has a first side panel 3*a* and a second side panel 3*b*. The first side panel 3*a* and the second side panel 3*b* form side walls of the main chassis member 3 and are located at opposite ends of the main chassis member 3.

Figure 2:
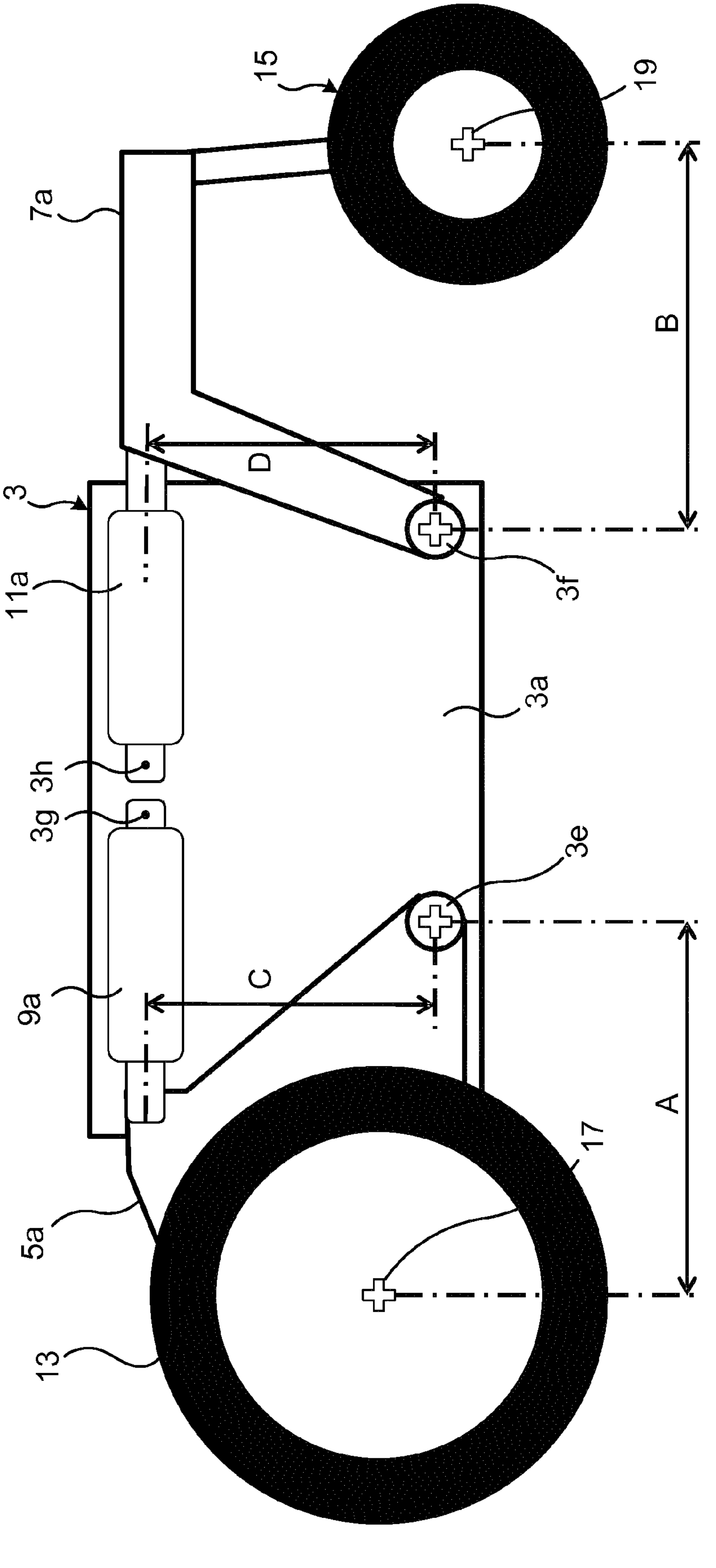
FIG. 2 is a schematic side view of the chassis arrangement in FIG. 1.

It should be noted that each of the first side panel 3*a* and the second side panel 3*b* may define continuous surfaces without through-openings other than possibly for screws and/or bolts, as shown in FIG. 2, or they may have through-openings that form a significant or major part of the sides, as shown in the example in FIGS. 1*a* and 1*b*. The latter design can be beneficial in that the main chassis member 3 may be made lighter.

The main chassis member 3 may further have a bottom portion 3*c* extending between the first side panel 3*a* and the second side panel 3*b*. The bottom portion 3*c* thus defines a bottom surface of the main chassis member 3. The main chassis 3 may according to one variation be arranged to house a battery unit, which, for example, may be mounted on the bottom portion 3*c*.

The main chassis member 3 may beneficially be made relatively small. Its dimensions from rear to back can for example be made about twice as large as the corresponding dimension of a battery unit that is to be housed by the main chassis member 3.

The first side panel 3*a* comprises two pivot arm attachment arrangements 3*e* and 3*f* and two spring attachment arrangements 3*g* and 3*h*. The second side panel 3*b* also comprises corresponding two pivot arm attachment arrangements and two spring attachment arrangements; these are not marked with reference numerals in FIG. 1*a*.

Each pivot arm attachment arrangement 3*e*, 3*f* may comprise an opening extending into the first side panel 3*a* or the second side panel 3*b*.

Alternatively, each pivot arm attachment arrangement 3*e*, 3*f* may comprise, for example, a journal, a stud or pivot, each defining a pivot axis for a pivot arm assembly.

Each spring attachment arrangement 3*g*, 3*h* may comprise an opening extending through the first side panel 3*a* or the second side panel 3*b*. Alternatively, each spring attachment arrangement 3*g*, 3*h* may comprise, for example, a journal, a stud or pivot, each defining a pivot axis for a spring assembly.

On each of the first side panel 3*a* and the second side panel 3*b*, the pivot arm attachment arrangements 3*e* and 3*f* are located on the lower portion of these side panels 3*a*, 3*b*. The spring attachment arrangements 3*g*, 3*f* are located on the upper portion of the first side panel 3*a* and the second side panel 3*b*. The orientations "lower" and "upper" as used herein are defined with respect to the horizontal plane when the chassis arrangement 1 is placed on flat ground with its intended orientation when wheels are assembled thereto.

The pivot arm attachment arrangements 3*e* and 3*f* may according to one variation be located as close to the lower edge of the first side panel 3*a* and the second side panel 3*b*, respectively, as possible without risking the robustness of the main chassis member 3. Similarly, according to one variation, the spring attachments 3*g* and 3*h* may be located as close to the upper edge of the first side panel 3*a* and the second side panel 3*b*, respectively, as possible without risking the robustness of the main chassis member 3.

According to one variation, the main chassis member 3 has a torsional stiffness which is greater than 1200 Nm/degree. The torsional stiffness may be obtained by the combination of the selection of material of which the main chassis member is made, the thickness of the material, and the dimensions of the main chassis member.

The torsional stiffness is in this case measured as torsion around a longitudinal axis, i.e. an axis perpendicular to the wheel axes of the wheelchair. The torsional stiffness is of main importance at the points or areas where force is transmitted in one way or the other.

According to one variation, the resulting total torsional stiffness of the chassis arrangement 1 of a complete wheelchair is at least 1800 Nm/degree, more preferably greater than 2000 Nm/degree, even more preferably greater than 2200 Nm/degree.

According to one variation, the main chassis member contributes to at least 50% of the torsional stiffness of the chassis arrangement when assembled with an electrically powered wheelchair. There may be a number of other members attached to the main chassis member that influences the torsional stiffness of the chassis arrangement. As an example, a battery unit may form short sides between the side panels, which short sides influence the total torsional stiffness. When mounting a seat frame or a seat elevator arrangement to the chassis arrangement, the attachment arrangement against the main chassis member may form a top plate of the main chassis member, influencing the total torsional stiffness.

According to one variation, each of the first side panel 3*a* and the second side panel 3*b* has a panel thickness of at least 7 millimeters around the pivot arm attachment arrangements 3*e*, 3*f* and the spring attachment arrangements 3*g*, 3*h*. This is schematically indicated by areas 6 in FIG. 1. Thus, in the event that the pivot arm attachment arrangements 3*e*, 3*f* and/or the spring attachment arrangements 3*g*, 3*h* are through-openings extending through the first side panel 3*a* or the second side panel 3*b*, the side panels 3*a*, 3*b* have a thickness of at least 7 mm. In other words, each through-opening extends at least 7 mm from one side of a side panel

3*a*, 3*b* to the other, opposite, side thereof. In the event that the pivot arm attachment arrangements 3*e*, 3*f* and/or the spring attachment arrangements 3*g*, 3*h* are journals, studs or pivots, each defining a respective pivot axis, the journals, studs or pivots provide an additional thickness to the 7 mm thick side panels 3*a*, 3*b*.

According to one variation, the thickness of the first side panel 3*a* and the second side panel 3*b*, around or surrounding the pivot arm attachment arrangements 3*e*, 3*f* and spring attachment arrangements 3*gm* 3*h*, is at least 8 millimeters.

According to one variation, the main chassis member 3 is made of a single piece of metal, such as steel, or other high-tensile material. The single piece of metal may thus according to one example have a thickness of at least 7 mm.

The main chassis member 3 may for example be formed by a bent plate or it may be formed by means of moulding. Alternatively, the main chassis arrangement 3 may be made of several pieces of metal or other high-tensile material that are welded or riveted.

The chassis arrangement 1 comprises two first pivot arm assemblies 5*a* and 5*b* and two second pivot arm assemblies 7*a* and 7*b*. Each of the first pivot arm assemblies 5*a* and 5*b* is pivotally attached to a respective pivot arm attachment arrangement 3*e*. Each of the second pivot arm assemblies 7*a* and 7*b* is pivotally attached to a respective pivot arm attachment arrangement 3*f*.

According to one variation, each first pivot arm assembly 5*a* and 5*b* is a front pivot arm assembly and each second pivot arm assembly 7*a* and 7*b* is a rear pivot arm assembly. The rear pivot arm assemblies 7*a*, 7*b* may according to one variation be castor wheel pivot arm assemblies and the front pivot arm assemblies 5*a*, 5*b* may according to one variation be drive wheel pivot arm assemblies. Other variations are of course also possible, as would be apparent to the person skilled in the art.

The chassis arrangement 1 comprises two first spring assemblies 9*a*, 9*b*, each comprising a respective spring, and two second spring assemblies 11*a* and 11*b*, each comprising a respective spring. The first spring assemblies 9*a*, 9*b* and the second spring assemblies 11*a*, 11*b* may also comprise means for pivotally connecting them to the main chassis member 3, in particular the first side panel 3*a* and the second side panel 3*b*, respectively. The first spring assemblies 9*a*, 9*b* and the second spring assemblies 11*a*, 11*b* may comprise means for pivotally connecting them to pivot arm assemblies 5*a*, 5*b* and 7*a*, 7*b*, respectively. The first spring assemblies 9*a*, 9*b* are pivotally coupled to a respective spring attachment arrangement 3*g*. The second spring assemblies 11*a*, 11*b* are pivotally coupled to a respective spring attachment arrangement 3*h*. Each first spring assembly 9*a*, 9*b* is pivotally coupled to a respective first pivot arm assembly 5*a*, 5*b*. Each second spring assembly 11*a*, 11*b* is pivotally coupled to a respective second pivot arm assembly 7*a*, 7*b*. To this end, the first pivot arm assemblies 5*a*, 5*b* are pivotally coupled, via a respective pivot arm attachment arrangement 3*e*, to a respective one of the first side panel 3*a* and the second side panel 3*b*. Furthermore, the second pivot arm assemblies 7*a*, 7*b* are pivotally coupled, via a respective pivot arm attachment arrangement 3*f*, to a respective one of the first side panel 3*a* and the second side panel 3*b*. The first spring assemblies 9*a* and the second spring assemblies 9*b* are furthermore pivotally coupled to a respective one of the first side panel 3*a* and the second side panel 3*b*, via a respective spring attachment arrangement 3*g* or 3*h*.

Figure 3A:
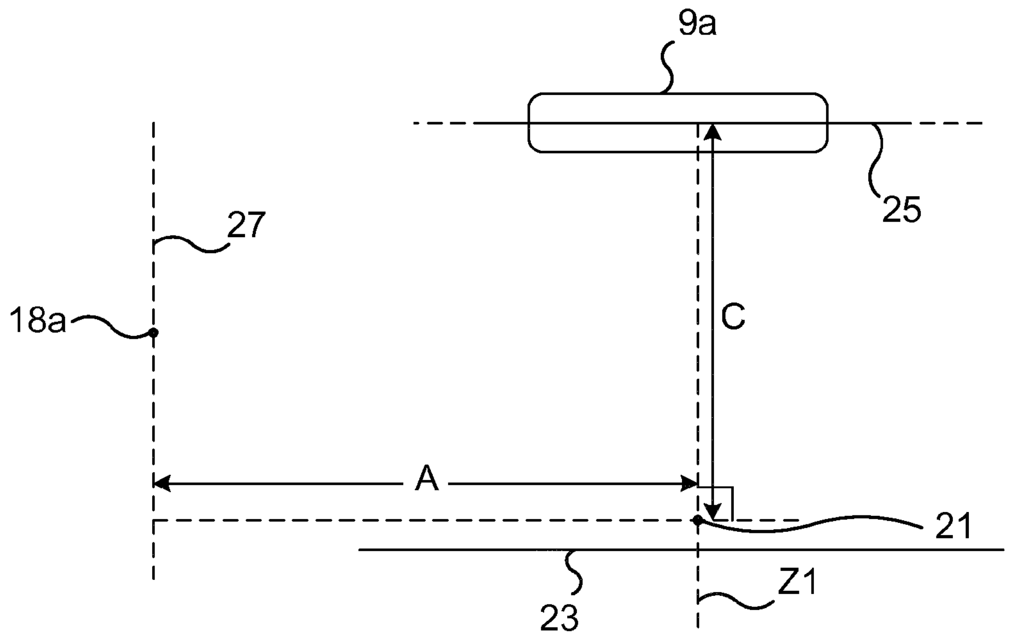
FIGS. 3*a* and 3*b* depict various distance measures of each of the chassis arrangements in FIGS. 1 and 2.
Figure 3B:
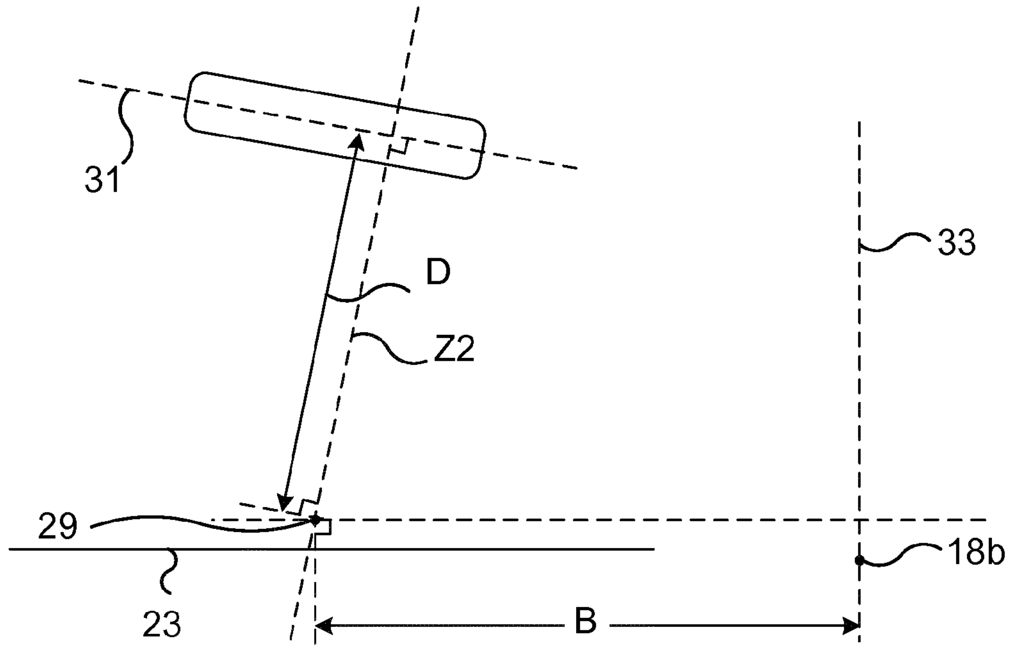

The first spring assemblies 9*a*, 9*b* and the second spring assemblies 11*a*, 11*b* are preferably arranged such that the compression axis of each spring is horizontal or essentially horizontal, when the chassis arrangement 1, with wheels assembled, is placed on horizontal ground. Hence, according to one embodiment, each compression axis is essentially parallel to a base plane 23, as shown in FIGS. 3*a* and 3*b*, defined by the bottom surface of the bottom portion 3*c*. The compression axes may according to one variation have a slight inclination, e.g. 10-15 degrees, relative to the horizontal.

The springs of the first spring assemblies 9*a* and 9*b* may according to one variation have spring constants corresponding to a stiffness that is lower than 400 pounds per square inch (psi), preferably lower than 380 psi, even more preferably lower than 360 psi. According to one variation, the springs of the first spring assemblies 9*a* and 9*b* have spring constants corresponding to a stiffness equal to or lower than 350 psi.

The springs of the second spring assemblies 11*a* and 11*b* may have spring constants corresponding to a stiffness lower than 400 psi, preferably lower than 380 psi, even more preferably lower than 360 psi. According to one variation, the springs of the second spring assemblies 11*a* and 11*b* have spring constants corresponding to a stiffness equal to or lower than 350 psi.

According to one variation, the stiffness of the springs of the first spring assemblies 9*a*, 9*b*, is higher than the stiffness of the springs of the second spring assemblies 11*a*, 11*b*.

The springs of the first spring assemblies 9*a*, 9*b* and the springs of the second spring assemblies 11*a*, 11*b* may according to one variation have a resonance frequency below 5 Hz, preferably less than 4 Hz, such as 3 Hz. According to one variation, the resonance frequency is at most 2 Hz, preferably 1 Hz.

FIG. 2 depicts a schematic side view of the chassis arrangement 1 in FIG. 1. In general, it can be seen that the pivot arm attachment arrangements 3*e* and 3*f* are located in the lower portion of the first side panel 3*a* and the spring attachment arrangements 3*g* and 3*h* are located in the upper portion of the first side panel 3*b*. The same also applies to the second side panel 3*b*. A wheel 13 is mounted to the first pivot arm assembly 5*a* and a wheel 15 is mounted to the second pivot arm assembly 7*a*. The wheel 13 is rotatable about a first wheel axis 17 which is extends through each first pivot arm assembly 5*a*, 5*b* and the wheel 15 is rotatable about a second wheel axis 19 which extends through each second pivot arm assembly 7*a*, 7*b*.

In order to obtain even better, softer, suspension, certain ratios between distances A, B, C and D between the wheel axes and the spring attachment arrangements and the pivot arm attachment arrangements should be fulfilled. Thus, according to one variation of the chassis arrangement 1, the ratio A/C should be as small as possible, preferably less than 1.4, even more preferably less than 1.3, or 1.2, 1.1 or 1. The ratio B/D should also be as small as possible, preferably less than 1.5, even more preferably less than 1.3, or 1.2, 1.1 or 1. The definition of the distances A, B, C and D will be described in more detail with reference to FIGS. 3*a* and 3*b*.

FIG. 3*a* schematically depicts the first wheel axis 17 and the centre point or pivot axis point 21 of the pivot arm attachment arrangement 3*e* shown in FIG. 2. Furthermore, the first spring assembly 9*a* in FIG. 2 is schematically shown in FIG. 3*a*. A base plane 23 defined by the bottom portion 3*c* shown in FIG. 1, is also shown.

It is assumed that the bottom portion 3*c* has a portion that allows the base plane to be defined as a plane that is parallel to the horizontal when the chassis arrangement 1 as shown in FIG. 2, with wheels 13 and 15 mounted, is placed on horizontal ground. In case of embodiments where the bottom portion is constructed in a manner which does not allow for the definition of such a plane, the term “base plane” should be substituted with “horizontal plane” and the chassis arrangement 1 should be placed on horizontal ground in order to obtain the same definition of the distances A-D as below.

A first spring compression plane 25 is defined along the central spring compression axes of the springs of the first spring assemblies 9*a* and 9*b*. To this end, the first spring compression axis of each of the first spring assembly 9*a* and 9*b* lies in the first spring compression plane 25.

For each of the two sides defined by the first side panel 3*a* and the second side panel 3*b*, the distance C is defined as the distance from the corresponding pivot axis point 21 to the first spring compression plane 25.

For each of the two sides defined by the first side panel 3*a* and the second side panel 3*b*, the distance A is defined as the distance from the pivot axis point 21 to a first wheel axis intersecting plane 27 which extends parallel to a normal to the base plane 23 and which intersects the first wheel axis 17.

It should be noted that only a cross-section of the base plane 23, the first spring compression plane 25 and of the first wheel axis intersecting plane 27 is shown in FIG. 3*a*.

FIG. 3*b* schematically depicts the second wheel axis 19 and the centre point or pivot axis point 29 of the pivot arm attachment arrangement 3*f* shown in FIG. 2. Furthermore, the second spring assembly 11*a* in FIG. 2 is schematically shown in FIG. 3*b*. The base plane 23 defined by the bottom portion 3*c* shown in FIG. 1, is also shown. A second spring compression plane 31 is defined along the central spring compression axes of the springs of the second spring assemblies 11*a* and 11*b*. To this end, the second spring compression axis of each of the second spring assembly 11*a* and 11*b* lies in the second spring compression plane 31.

For each of the two sides defined by the first side panel 3*a* and the second side panel 3*b*, the distance D is defined as the distance from the corresponding pivot axis point 29 to the second spring compression plane 31.

For each of the two sides defined by the first side panel 3*a* and the second side panel 3*b*, the distance B is defined as the distance from the pivot axis point 29 to a second wheel axis intersecting plane 33 which extends parallel to a normal to the base plane 23 and which intersects the second wheel axis 19.

It should be noted that only a cross-section of the base plane 23, the second spring compression plane 31 and of the second wheel axis intersecting plane 33 is shown in FIG. 3*b*.

Figure 4:
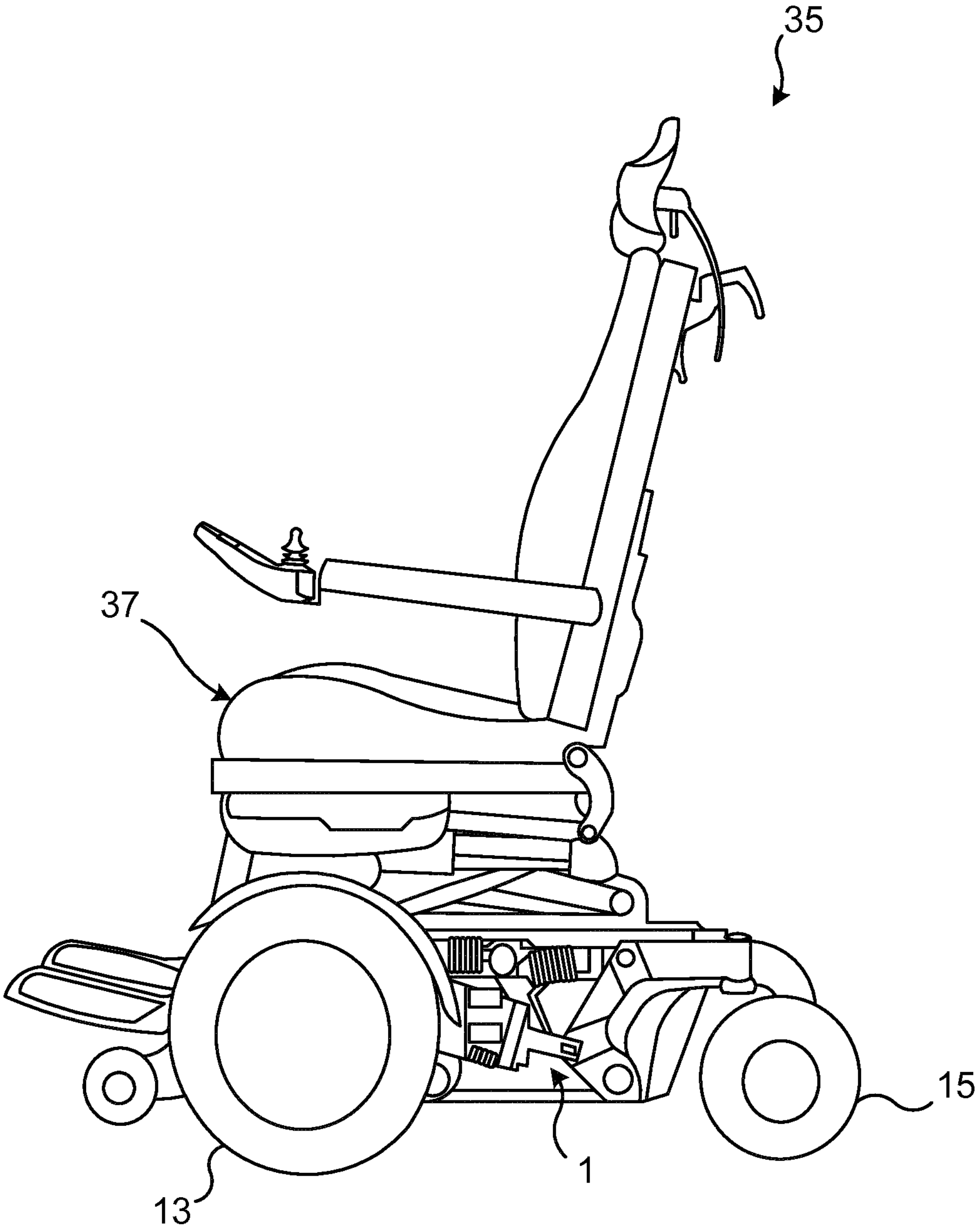
FIG. 4 is a perspective view of an example of an electrically powered wheelchair comprising a chassis arrangement.

FIG. 4 depicts an example of an electrically powered wheelchair 35. Although the exemplified wheelchair 35 is of frontwheel drive type, it should be noted that the wheelchair alternatively could be of for example midwheel drive type, back wheel drive type, four wheel drive type or six wheel drive type. The electrically powered wheelchair 35 comprises a chassis arrangement 1, wheels 13 and 15 and a seat assembly 37 mounted to the chassis arrangement 1.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A chassis arrangement for an electrically powered wheelchair, wherein the chassis arrangement comprises:

a main chassis member having a first side panel defining a first side of the main chassis member, and a second side panel defining a second side of the main chassis member, the second side being opposite to the first side, wherein each of the first side panel and the second side panel has a plurality of spring attachment arrangements, each of the plurality of spring attachment arrangements at each of the first side panel and the second side panel configured to attach to a different one of a plurality of spring assemblies, wherein each of the first side panel and the second side panel has a plurality of pivot arm attachment arrangements, each of the plurality of pivot arm attachment arrangements at each of the first side panel and the second side panel configured to attach to a different one of a plurality of pivot arm assemblies, wherein the main chassis member consists of a single piece of metal, and wherein the main chassis member is a bent plate which defines the first side panel and the second side panel, and which has a bottom portion extending between the first side panel and the second side panel.

2. The chassis arrangement of claim 1, wherein each of the plurality of spring attachment arrangements are arranged at an upper portion of the first side panel or the second side panel, and wherein each of the plurality of pivot arm attachment arrangements are arranged at a lower portion of the first side panel or the second side panel.

3. The chassis arrangement of claim 1, wherein the single piece of metal has a thickness of at least 7 mm.

4. The chassis arrangement of claim 1, wherein each of the plurality of spring attachment arrangements at each of the first side panel and the second side panel comprises an opening extending into the first side panel or the second side panel, and wherein each of the plurality of pivot arm attachment arrangements at each of the first side panel and the second side panel comprises a journal or pivot extending from the first side panel or the second side panel.

5. An electrically powered wheelchair comprising the chassis arrangement of claim 1.

6. The electrically powered wheelchair of claim 5, wherein the main chassis member contributes to at least 50% of the torsional stiffness of the chassis arrangement.

7. The chassis arrangement of claim 1, wherein the main chassis member has a torsional stiffness greater than 1200 Nm/degree.

* * * * *